(12) United States Patent
Ericson et al.

(10) Patent No.: US 8,418,052 B2
(45) Date of Patent: Apr. 9, 2013

(54) PROCESSING OF DOCUMENTS

(75) Inventors: Petter Ericson, Malmö (SE); Tomas Lundström, Sollentuna (SE)

(73) Assignee: Anoto Aktiebolag (Anoto AB), Lund (SE)

( * ) Notice: Subject to any disclaimer, the term of this patent is extended or adjusted under 35 U.S.C. 154(b) by 3524 days.

(21) Appl. No.: 09/813,112

(22) Filed: Mar. 21, 2001

(65) Prior Publication Data

US 2002/0054778 A1 May 9, 2002

Related U.S. Application Data

(60) Provisional application No. 60/207,849, filed on May 30, 2000.

(30) Foreign Application Priority Data

Mar. 21, 2000 (SE) ........................... 0000954

(51) Int. Cl.
*G06F 17/24* (2006.01)

(52) U.S. Cl.
USPC .............. 715/232; 400/61; 400/76; 715/230; 715/233

(58) Field of Classification Search ............ 715/530, 715/511, 541, 500.1, 230, 232, 233; 345/179; 382/187, 188; 400/61, 76

See application file for complete search history.

(56) References Cited

U.S. PATENT DOCUMENTS

| 4,494,862 A | | 1/1985 | Tanaka |
| 4,786,896 A | * | 11/1988 | Harte ............................. 345/173 |
| 4,806,976 A | | 2/1989 | Kato et al. |
| 4,835,544 A | | 5/1989 | Winterburn |
| 4,887,128 A | | 12/1989 | Jamali et al. |
| 4,969,013 A | | 11/1990 | Tsilibes |
| 5,051,736 A | | 9/1991 | Bennett et al. |
| 5,245,165 A | | 9/1993 | Zhang |
| 5,342,671 A | | 8/1994 | Stephenson |
| 5,442,147 A | | 8/1995 | Burns et al. |
| 5,652,412 A | * | 7/1997 | Lazzouni et al. .......... 178/18.01 |
| 5,661,506 A | * | 8/1997 | Lazzouni et al. ............. 345/179 |
| 5,852,434 A | | 12/1998 | Sekendur |
| 5,890,177 A | * | 3/1999 | Moody et al. .................. 715/511 |
| 5,897,648 A | * | 4/1999 | Henderson .................... 715/530 |
| 6,000,613 A | | 12/1999 | Hecht et al. |
| 6,041,335 A | * | 3/2000 | Merritt et al. ................. 715/512 |
| 6,327,395 B1 | | 12/2001 | Hecht et al. |
| 6,661,920 B1 | * | 12/2003 | Skinner ......................... 715/541 |
| 6,738,053 B1 | * | 5/2004 | Borgstrom et al. ........... 345/179 |

(Continued)

FOREIGN PATENT DOCUMENTS

| EP | 0469864 | | 2/1992 |
| GB | 2280329 | A | 1/1995 |

(Continued)

*Primary Examiner* — William Bashore
*Assistant Examiner* — Gregory A Distefano
(74) *Attorney, Agent, or Firm* — Birch, Stewart, Kolasch & Birch, LLP

(57) ABSTRACT

A document editing method includes transferring document information to a printing device capable of printing the document information on a surface coded with a position-coding pattern. Editing information is received from a reading device capable of reading position information from the position-coded surface.

33 Claims, 5 Drawing Sheets

```
Shall I compare thee to a summer's day?         501
Thou art more lovely and more temperate:
Rough winds do shake the darling buds of May,
And summer's lease hath all two short a date:  /o ← 502
Sometime too hot the eye of heaven shines,
And often is his green compexion dimm'd;X gold ← 503
And every fair from fair sometime declines,
By chance or nature's changing course untrimm'd;
But thy eternal summer shall fade not          ← 504
Nor lose possession of that fair thou owest;
Nor shall Death brag thou wander'st in his shade,
When in eternal lines to time thou growest:
So long as men can breathe or eyes can see,
So long lives this and this gives life to thee.
```

U.S. PATENT DOCUMENTS

| | | | |
|---|---|---|---|
| 6,752,317 B2 * | 6/2004 | Dymetman et al. | ..... 235/462.45 |
| 6,766,942 B1 | 7/2004 | Silverbrook et al. | |
| 2002/0020750 A1 * | 2/2002 | Dymetman et al. | ..... 235/472.01 |

FOREIGN PATENT DOCUMENTS

| | | | |
|---|---|---|---|
| GB | 2306669 A * | 5/1997 | |
| JP | 59-91585 A | 5/1984 | |
| JP | 3-133244 A | 6/1991 | |
| JP | 8-36452 A | 2/1996 | |
| JP | 10-257309 | 9/1998 | |
| WO | WO-97/15891 A1 | 5/1997 | |
| WO | WO 98/20446 | 5/1998 | |
| WO | WO 99/50787 | 10/1999 | |
| WO | WO 00/31682 | 6/2000 | |
| WO | WO 00/73983 A1 | 12/2000 | |
| WO | WO 01/16691 A1 | 3/2001 | |
| WO | WO 01/26032 A1 | 4/2001 | |
| WO | WO 01/26033 A1 | 4/2001 | |
| WO | WO 01/61449 A2 | 8/2001 | |

* cited by examiner

*Shall I compare thee to a summer's day?*   501

*Thou art more lovely and more temperate:*

*Rough winds do shake the darling buds of May,*

*And summer's lease hath all t̸w̸o short a date:* /○ ← 502

*Sometime too hot the eye of heaven shines,*

*And often is his ~~green~~ compexion dimm'd;* ϒ gold ← 503

*And every fair from fair sometime declines,*

*By chance or nature's changing course untrimm'd;*

*But thy eternal summer shall ⌒fade/not* ← 504

*Nor lose possession of that fair thou owest;*

*Nor shall Death brag thou wander'st in his shade,*

*When in eternal lines to time thou growest:*

*So long as men can breathe or eyes can see,*

*So long lives this and this gives life to thee.*

*Fig. 5a*

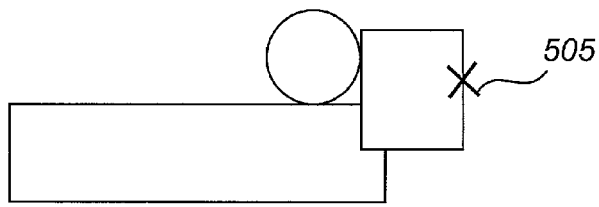

PROCESSING OF DOCUMENTS

CROSS-REFERENCE TO RELATED APPLICATIONS

This application claims priority benefits based on Swedish Patent Application No. 0000954-8, filed Mar. 21, 2000, and U.S. Provisional Application No. 60/207,849, filed May 30, 2000, the technical disclosures of both of which are hereby incorporated herein by reference.

DESCRIPTION OF THE INVENTION

1. Field of the Invention

The invention relates to methods and devices for editing electronically stored documents.

2. Background of the Invention

U.S. Pat. No. 5,897,648 describes a device and a method for editing electronic documents. An original document is scanned into a computer where an electronic version of the document is stored. The original is then placed on an X/Y digitizing tablet and the position of the document on the digitizing tablet is correlated with the scanned version of the document. Editing is then carried out on the digitizing tablet with the aid of a digitizing pen coupled to the tablet. The editing is done in the form of markings on the original, the positions of the markings being transferred via the tablet to the computer. The editing markings are interpreted and converted into electronic form in the computer, after which the edited electronic document is displayed.

In the above reference a user is located at the computer or at least at the digitizing tablet when editing.

SUMMARY OF A FEW ASPECTS OF THE INVENTION

In accordance with the invention, there may be provided a method for editing document information of a document including transferring the document information to a printing device capable of printing the document information on a surface having a position-coding pattern; receiving editing information from a reading device capable of reading position information from the position-coded surface; interpreting the editing information; and changing the document information depending on the interpretation of the editing information, thereby producing an updated document.

There may also be provided a system for editing document information in a document including storage means for storing the document; means for transferring the document information of the document to a printing device capable of printing the document information on a surface provided with a position-coding pattern; means for receiving editing information from a reading device capable of reading position information from a position-coded surface; means for interpreting the editing information; and means for changing the document information based on the interpretation of the editing information, thereby producing an updated document.

The foregoing summarizes only a few aspects of the invention and is not intended to be reflective of the full scope of the invention as claimed. Additional features and advantages of the invention are set forth in the following description, may be apparent from the description, or may be learned by practicing the invention. Moreover, both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. The figures are not according to scale and some dimensions are greatly exaggerated to show more clearly specific features of the invention.

FIG. 5a shows a printout of a text document with manually drawn editing instructions, consistent with the present invention.

FIG. 5b shows a printout of a drawing document with a manually drawn editing instruction, consistent with the present invention.

DESCRIPTION OF PREFERRED EMBODIMENTS

Figure 1:
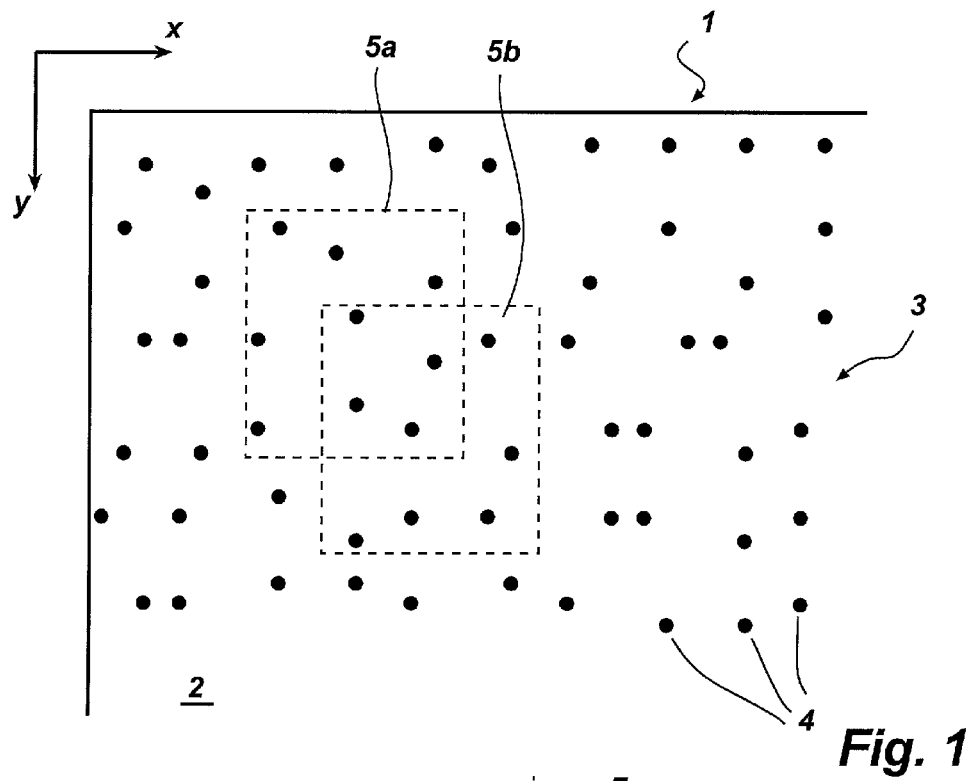
FIG. 1 schematically shows an embodiment of a product that is provided with a position-coded pattern, consistent with the present invention.
Figure 2:
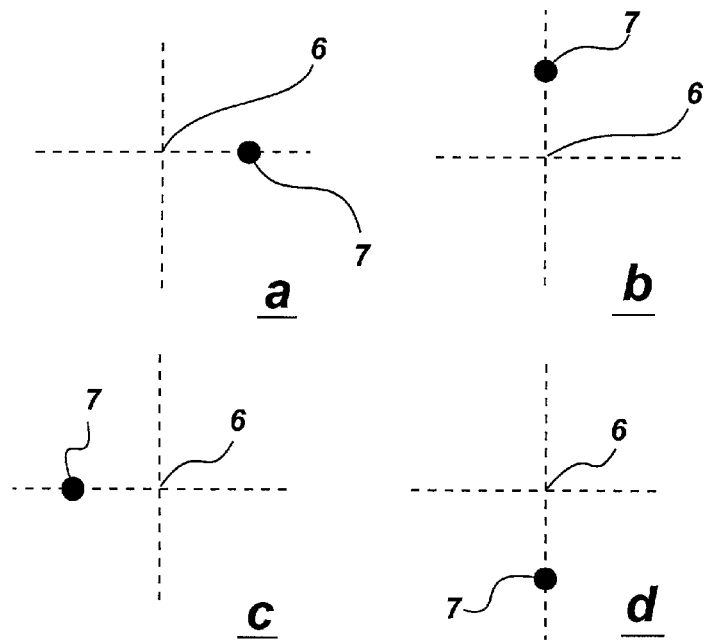
FIGS. 2a-2d schematically show symbol configurations in consistent with the present invention.

In its most general form, the invention may involve an electronically stored document of any type such as text, image, drawing, etc. The document may be printed on a surface, such as, a sheet of paper, which may be provided with a position-coding pattern. Manual editing may then carried out on the printout surface with a device which may include means for reading the position-coding pattern and may also include a pen point for marking on the surface. Editing may be done by means of a code that is in the form of symbols from a predetermined set of symbols on the sheet of paper. The editing information, i.e. the symbols applied to the surface, may be transferred to a storage and processing device, for example, a computer. This transfer can be done directly during the editing or on a later occasion. Interpretation of the editing code may then be done, wholly or partially in the computer, in interaction with the document stored in the computer. Changes may then be made to the stored document based on the interpretation.

A users may find it relatively easy to process documents in this manner since it involves the motions of traditional paper and pencil editing. As a result, there may be a low learning threshold associated with use of the invention.

Furthermore, document editing may be accomplished without the editor necessarily needing to be near the computer where the document may be stored, or to be tied to a complicated input device. Depending on how the invention is implemented, the editing information may be advantageously stored in the input device for subsequent transfer to the computer/storage location.

The invention may also permit a user to view edits in hard copy on the very surface that is used to electronically input those changes.

For the sake of clarity, the detailed description of the invention below has been divided into a number of part-descriptions. As an introduction, a coding pattern will be presented with reference to FIGS. 1, 2a-d, and 3. This coding pattern represents position information that can be used in a method according to the invention. After presentation of the coding pattern, a device that may be used for manual editing of a printed document is presented in connection with FIG. 4. The device, which can be pen-shaped, reads the position-coding pattern and text where applicable and may be provided with a pen point to make editing markings on the printed document visible. Then, with reference to FIGS. 5a and 5b, examples are presented of manual editing of information drawn on a printout of a text document (FIG. 5a) and a document (FIG. 5b) that contains a drawing figure. Then, a method and system for editing document information is presented with reference to FIG. 5c and FIG. 6.

The position-coding pattern and the reading device illustrated in FIGS. 1-4 below are further described in applicant's international patent publication WO 01/16691, as well as in applicant's international patent applications PCT/SE00/01895 and PCT/SE00/01897, the technical disclosures of both of which are incorporated herein by reference.

FIG. 1 shows part of a product in the form of a sheet of paper 1 with an optically readable position-coding pattern 3 on its surface 2, enabling position-determination to be carried out. The position-coding pattern 3 may consist of symbols 4 which may be systematically arranged over the surface 2 so that the surface 2 has a "patterned" appearance. The sheet of paper has an x coordinate axis and a y coordinate axis. In this case, position determination can be carried out on the entire surface of the product. In other cases, the surface that allows position determination may consist of a smaller part of the product. For example, the sheet of paper 1 can be used for producing an electronic representation of information that is written or drawn on the surface. The electronic representation can be produced by continuously determining the position of the pen on the sheet of paper by reading the position-coding pattern 3 while writing on the surface with a pen.

The position-coding pattern 3 may comprise a virtual raster, which is neither visible to the human eye nor detectable directly by a device that determines positions on the surface. The position-coding pattern 3 may further comprise a plurality of symbols 4, each being able to assume one of four values, "1"-"4", as will be described in the text that follows. The position-coding pattern 3 in FIG. 1 has been greatly enlarged for the sake of clarity. Also, only a part of the paper is shown.

The position-coding pattern 3 may be arranged in such a manner so that the position of a partial surface on the writing surface may be coded by the symbols on this partial surface. A first and a second partial surface 5a, 5b are shown by dashed lines in FIG. 1. The part of the position-coding pattern 3 (in this case 3×3 symbols) that is located on the first partial surface 5a may code a first position, and the part of the position-coding pattern 3 that is located on the second partial surface 5b may code a second position. The position-coding pattern 3 may thus be partially common to the adjoining first and second positions. Such a position-coding pattern is designated as "floating" in this disclosure.

FIGS. 2a-d show an embodiment of a symbol that can be used in the position-coding pattern 3 according to the invention. The symbol may be defined by a virtual raster point 6, which is represented by the intersection between the raster lines, and a making 7, which may have the form of a dot. The value of the symbol may depend on where the marking is located. In the example in FIG. 2, there are four possible locations, one on each of the raster lines extending from the raster points 6. The placement from the raster point 6 may be equal for all values. In the text that follows, the symbol has the value 1 in FIG. 2a, the value 2 in FIG. 2b, the value 3 in FIG. 2c, and the value 4 in FIG. 2d. In other words, there are four different types of symbol.

Thus, each symbol can thus represent four values "1-4". This means that the position-coding pattern 3 can be divided into a first position code for the x coordinate, and a second position code for the y coordinate. The dividing is done in accordance with the following:

| Symbol value | x code | y code |
| --- | --- | --- |
| 1 | 1 | 1 |
| 2 | 0 | 1 |
| 3 | 1 | 0 |
| 4 | 0 | 0 |

Thus, the value of each symbol may be translated into a first digit, in the case a first bit, for the x code and a second digit, in this case second bit, for the y code. In this manner, two completely independent bit patterns may be obtained. The patterns can be combined into a common pattern, which may be coded graphically with the aid of a plurality of symbols according to FIG. 2.

Each position may be coded by means of a plurality of symbols. In this example, 4×4 symbols are used for coding a position in two dimensions, i.e. an x coordinate and a y coordinate.

The position code may be built up by means of a number series of ones and zeros that the characteristic that no sequence of four bits, in the number series, occurs more than once in the series. The number series may be cyclic, which means that no sequence of four bits, in the number series, occurs more than once if the end of the series is coupled together with its beginning. Thus, a sequence of four bite may always have an unambiguously determined position in the number series.

The number series can be maximally 16 bits long for a sequence of four bits to have an unambiguously determined position in the number series. In this example, however, only a seven-bit-long number series according to the following is used:

"0 0 0 1 0 1 0"

This series contains seven unique sequences of four bits, which code a position in the series according to the following:

| Position in this series | Sequence |
| --- | --- |
| 0 | 0001 |
| 1 | 0010 |
| 2 | 0101 |
| 3 | 1010 |
| 4 | 0100 |
| 5 | 1000 |
| 6 | 0000 |

To code the x coordinate, the number series may be written sequentially in columns over the entire surface that is to be coded. The coding may be based on the difference or position displacement between numbers in adjoining columns. The magnitude of the difference may be determined by the position in the number series at which the column is allowed to begin (i.e. with which sequence). More specifically, taking the difference modulo seven between, on the one hand, a number which is coded by a four-bit sequence in a first column and which thus can have the value (position) 0-6, and, on the other hand, a corresponding number (i.e. a sequence on the same "level") in an adjoining column, may yield the same result independently of where along the two columns the comparison is made. Using the difference between two columns, an x coordinate can thus be coded which is constant for all y coordinates.

Since each position on the surface is coded with 4×4 symbols in this example, three differences (having the value 0-6) are available according to the above for coding the x coordinate. The coding may then be carried out in such a manner that of the three differences, one will always have the value 1 or 2 and the other two will have the value in the interval 3-6. Thus, no differences will be zero in the x code. In other words, the x code may be constructed in such a manner that the differences will be as follows:

(3-6) (3-6) (1-2) (3-6) (3-6) (1-2) (3-6) (3-6) (1-2).

Each x coordinate may thus be coded with two numbers between 3 and 6 and a subsequent number that is 1 or 2. If three is subtracted from the high numbers and one from the low one, a number in mixed base will be obtained which directly provides a position in the x direction, from which the x coordinate can then be determined directly as shown in the example below.

Using the principle described above, it is thus possible to code x coordinates 0,1,2 . . . by means of numbers which represent three differences. These differences may be coded with a bit pattern that is based on the above number series. Finally, the bit pattern can be coded graphically with the aid of the symbols in FIG. 2.

In many cases, when reading 4×4 symbols it may not be possible to get a complete number which codes the x coordinate but parts of two numbers. Since the least significant part of the numbers is always 1 or 2, however, a complete number can be reconstructed in a simple manner.

The y coordinates may be coded in accordance with the same principle as used for the x coordinates. The cyclic number series may be written repeatedly in horizontal rows over the surface that is to be position-coded. Exactly as in the case of the x coordinates, the rows may be allowed to begin at different positions, i.e. with different sequences, in the number series. However, it may not be the differences that are used for the y coordinates, but the coordinates may be coded with numbers that are based on the starting position of the number series in each row. When the x coordinate for 4×4 symbols has been determined, it is, in fact, possible to determine the starting position in the number series for the rows that are included in the y code in the 4×4 symbols. In the y code, the most significant digit may be determined by allowing this to be the only one that has a value in a specific interval. In this example, one row of four is allowed to begin at position 0-1 in the number series to indicate that this row relates to the least significant digit in a y coordinate, and the other three begin at positions 2-6. In the y direction, there is thus a series of numbers as follows:

(2-6) (2-6) (2-6) (0-1) (2-6) (2-6) (2-6) (0-1) (2-6).

Each y coordinate may be thus coded with three numbers between 2 and 6 and a subsequent number between 0 and 1.

If 1 is subtracted from the low number and 2 from the high one, a position in the y direction in mixed base may be obtained, in the same manner as for the x direction, from which the y coordinate can be determined directly.

With the above method, it is possible to code 4×4×2=32 positions in the x direction. Each such position may correspond to three differences, giving 3×32=96 positions. Furthermore, it is possible to code 5×5×5×2=250 positions in the y direction. Each such position may correspond to 4 rows, giving 4×250=1000 positions. Together, it is thus possible to code 96000 positions. Since the x coding may be based on differences it is, however, possible to select the position at which the first number series begins. Considering that this first number series can begin at seven different positions, it is possible to code 7×96000=672000 positions. The starting position of the first number series in the first column can be calculated when the x coordinate has been determined. The above-mentioned seven different starting positions of the first series can code different sheets or writing surfaces on a product.

To further illustrate the invention according to this embodiment, a specific example follows here which is based on the embodiment of the position code described.

Figure 3:
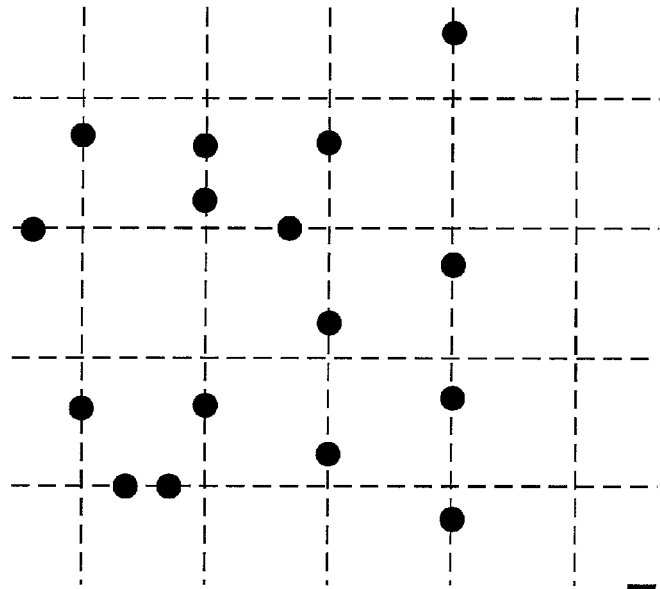
FIG. 3 schematically shows an example of 4×4 symbols that may be used for coding a position consistent with the present invention.

FIG. 3 shows an example of an image with 4×4 symbols that may be read by a device for position determination.

These 4×4 symbols have the following values:

4 4 4 2
3 2 3 4
4 4 2 4
1 3 2 4

These values represent the following binary x and y codes:

| x code: | y code: |
|---|---|
| 0 0 0 0 | 0 0 0 1 |
| 1 0 1 0 | 0 1 0 0 |
| 0 0 0 0 | 0 0 1 0 |
| 1 1 0 0 | 1 0 1 0 |

The vertical x sequences code the following positions in the number series: 2, 0, 4, and 6. The differences between the columns will be −2 4 2, which modulo 7 gives 5 4 2, which, in mixed base codes position (5-3)×8+(4-3)×2+(2−1)=16+2+1=19. Since the first coded x position is position 0, the difference which lies in the interval 1-2 and which appears in the 4×4 symbols is the twentieth such difference. Since, furthermore, there are a total of three columns for each such difference and there is a start column, the farthest vertical sequence to the right in the 4×4 x code belongs to the 61st column in the x code (3×20+1=61) and that farthest to the left belongs to the 58th.

The horizontal y sequences code the following positions in the number series: 0, 4, 1, and 3 in the number series. Since these series begin in the 58th column, the starting position of the rows are these numbers minus 57 modulo 7, providing the starting positions 6 3 0 2. Translated into digits in the mixed base, this becomes 6-2, 3-2, 0-0, 2-2=4 1 0 0, where the third digit is the least significant digit in the number in question. The fourth digit is then the most significant digit in the next number. In this case, it must be the same as in the number in question. (The exception is when the number is question consists of the highest possible digits in all positions. It is then apparent that the beginning of the next number is one greater than the beginning of the number in question).

The position of the four-digit number becomes 0×50+4×10+1×2+0×1=42 in the mixed base.

The third row in the y code is thus the 43rd which has starting position 0 or 1, and since there are four rows in total in each such row, the third row is number 43×4=172.

Thus, in this example, the position of the top left-hand corner for the 4×4 symbol group is (58,170).

Since the x sequences in the 4×4 group begin in row 170, the x columns of the entire pattern begin at positions ((2 0 4 6)–169) modulo 7=1 6 3 5 of the number series. Between the last starting position (5) and the first starting position, the numbers 0-19 are coded in mixed base and by adding together the representations for numbers 0-19 in mixed base, the total difference between these columns is obtained. A primitive algorithm for doing this is to generate these twenty numbers and directly add together their digits. The sum obtained is called s. The sheet of paper or writing surface is then given by (5-s) modulo 7.

In the example above, an embodiment has been described in which each position is coded with 4×4 symbols and a number series with 7 bits is used. Naturally, this is only an example. Positions can be coded with more or fewer symbols. The number of symbols does not need to be the same in both directions. The number series can have different lengths and do not need to be binary but may be built on another base. Different number series can be used for coding in the x direction and coding in the y direction. The symbols can have different numbers of values.

In the example above, furthermore, the marking is a dot. Naturally, it may have a different appearance. For example, it may consist of a line that begins at the virtual raster point and extends therefrom to a predetermined position.

In the example above, the symbols are used within a square partial surface for coding a position. The partial surface may have another form, for example, hexagonal or other shape. Neither do the symbols need to be arranged in rows and columns at an angle of 90 degrees with respect to one another but can also be arranged in other configurations.

Depending on the details of the embodiment, for the position code to be detectable, the virtual raster may have to be determined. In the case of only one pattern, this can be done by studying the distance between different markings. The shortest distance found between two markings must originate from two adjoining symbols having the value 1 and 3 so that the markings are located on the same raster line between two raster points. When such a pair of markings has been detected, the associated raster points can be determined with knowledge of the distance between the raster points and the displacement of the markings from the raster points. Once two raster points have been located, further raster points can be determined by means of measured distances to other markings and with knowledge of the relative distances of the raster points.

Figure 4:
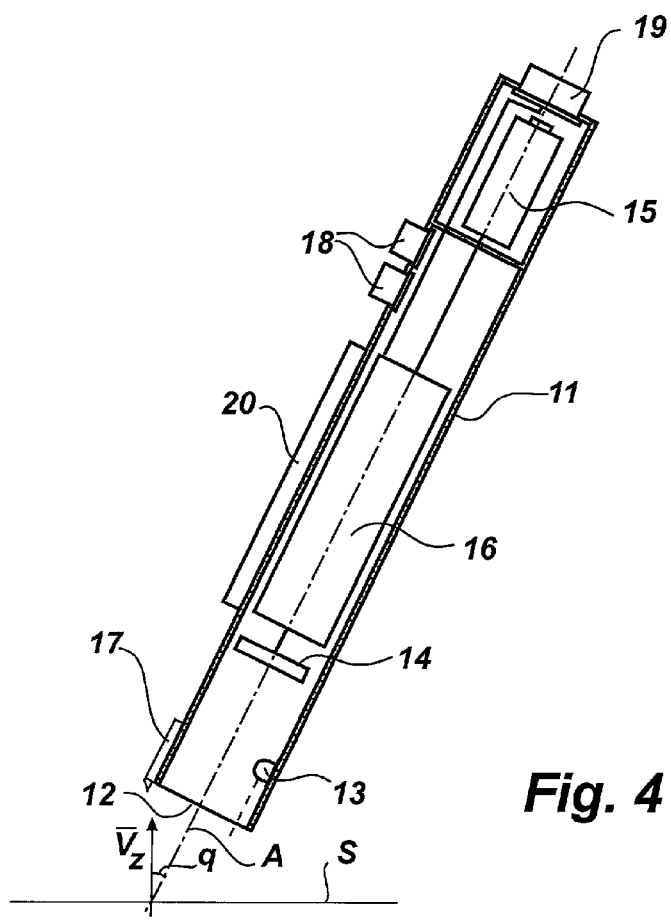
FIG. 4 schematically shows a device consistent with the present invention that may be used for position-determination in three dimensions.

An embodiment of an exemplary device for position determination, whose spatial relationship to a surface can be determined, is shown schematically in FIG. 4. It may include a casing 11, which may be approximately shaped like a pen. In a short end of the casing 11, there may be an opening 12. The short end may bear against or may be held at a short distance from a surface S on which the position determination is to occur. In the figure, a normal direction $\bar{v}_z$ to the surface S and an axis A extending through the device are indicated. Axis A forms an angle of inclination θ with the normal direction $\bar{v}_z$.

The casing 11 may be configured to accommodate an optical part, an electronic part, and a power supply. The optical part may include at least one light-emitting diode 13 for illuminating the surface to be imaged and a light-sensitive area sensor 14, for example a CCD or CMOS sensor for registering a two-dimensional image. The device may also contain a lens system (not shown). The power supply for the device may be obtained from a battery 15, which may be mounted in a separate compartment in the casing. The electronic part may include an image-processing means 16 for determining a position on the basis of the image registered by the sensor 14 and, more specifically, a processor unit with a processor programmed for reading images from the sensor and carrying out position determination on the basis of these images. Moreover, the processor unit may also store an identifier that is unique for each reading device. This device identifier may usually be composed of a plurality of digits and/or characters, and can be used in coded form. The identifier may be of use when performing the method according to the invention where a user is identified, by the device identifier, as a particular editor of a document.

In this embodiment, the device may also comprise a pen point 17 for writing normal pigment-based writing on the surface on which the position determination is to be carried out. The pen point 17 can be retracted and extended so that the user can control whether it is to be used. Alternatively, the pen point 17 may be non-retractable and covered by a cap (not shown) when not in use. In certain applications, the device does not need to have any pen point at all, or may employ some other marking implement.

The device may also include buttons 18, for activating and controlling the device. It may also have a transceiver 19 for wireless transmission, e.g. by means of IR light or radio waves, of information to and from the device. The device can also include a display 20 for showing positions or registered information.

Applicant's international patent publication WO 98/20446. The technical disclosure of which is incorporated herein by reference, describes a device for registering text. This device can be used for position determination and information reading/decoding if it is programmed in a suitable manner. If it is to be used for pigment-based writing, it may also have a pen point.

The device can be divided into different physical casings, a first casing containing components which are necessary for obtaining images of the coding pattern and for transferring them to components which are located in a second casing and which carry out the calculations on the basis of the registered image or images.

As mentioned, position determination may be done by a processor that may use software for locating and decoding the symbols in an image and for determining the positions from the codes thus obtained. On the basis of the above example, a person of ordinary skill in the art can design software that carries out position determination on the basis of an image of a part of a position-coding pattern. Furthermore, the person skilled in the art can design software on the basis of the above description, for printing the position-coding pattern.

In the embodiment above, the raster is a rectangular grid. It can also have other forms, i.e. non-rectangular.

In the embodiment above, the longest possible cyclic number series is not used. This provides a certain redundancy, which can be used, for example, for checking the turning of the read group of symbols.

In the embodiment above, the pattern is optically readable and the sensor thus is an optical sensor. Other position-coding patterns could be used within the scope of the present invention, for example, the pattern described in applicant's international patent publication WO 00/73983, or the related art position-coding patterns as disclosed in U.S. Pat No. 5,051,736, WO 00/31682 and EP-A-0 469 864. Each of these three documents are hereby incorporated herein by reference. Further, the pattern could be based on a parameter other than an optical parameter. Naturally, in that case, the sensor must be of a type that can read the parameter in question. Examples of such parameters are chemical, acoustic, or electromagnetic symbols. Also, capacitive or inductive symbols can be used.

FIG. 5a shows a printout 501 of a text document that may be stored in a computer. The printout 501 may be suitably done on a sheet of paper, the surface of which may be provided with a position-coding pattern as described above in connection with FIGS. 1-3. For the sake of clarity, however, no such pattern is shown in FIG. 5a.

In one embodiment of the invention, the digital pen of FIG. 4 may be used for providing editing information on the printout 501. Such editing information is schematically exemplified in FIG. 5a at reference numerals 502, 503 and 504. FIG. 5b schematically shows a drawing consisting of simple geometric figures. A cross marking 505 has been drawn on one side of a rectangle to indicate that the side is to be erased.

Figure 5C:
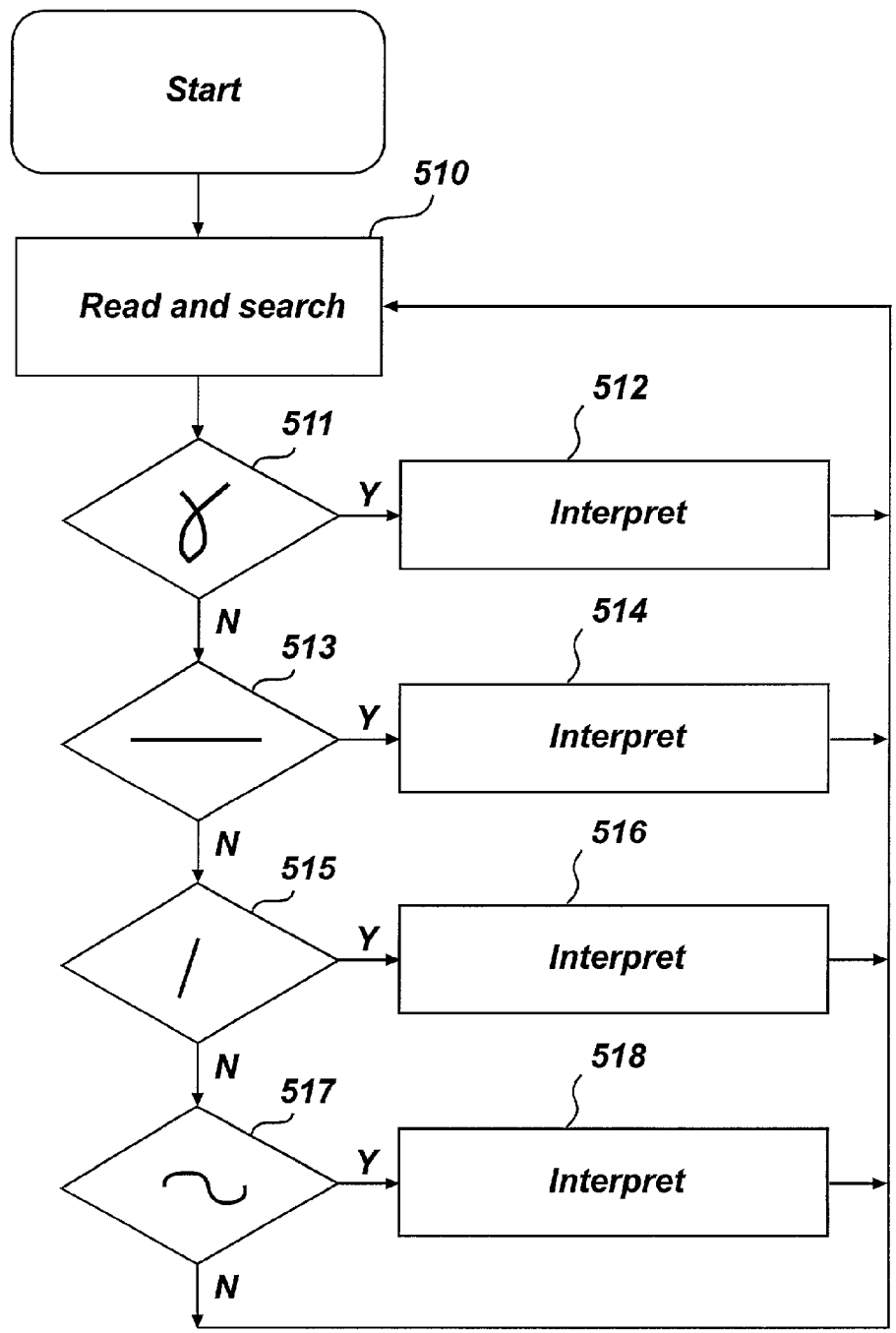
FIG. 5c shows a flow chart of a method consistent with the invention.

In FIG. 5c, a method for performing editing according to the invention is illustrated, with reference to the example of FIG. 5a.

In a read and search step 510, the text of the document is analyzed by associating each letter with its position and at the same time searching for editing symbols with corresponding positions. Then, in a number of decision steps, 511, 513, 515, and 517, the editing symbols are identified and corresponding interpretation steps, 512, 514, 516, are 518, are performed.

In the read and search step 510, the identity of the digital pen may also be determined by a transfer of a unique device identifier from the digital pen to the means for storing the document, for example, a memory unit in a computer or server. A particular digital pen may be associated with a particular user, i.e. editor or reviewer, of the document. If several editors, each with a digital pen having a unique device identity, make corrections to the text, these corrections may then be associated with the different users.

If the editing symbol of step 511 is found, a corresponding editing symbol and any handwritten text close to that editing symbol may be searched for in the margin area of the printed document. Such text may be interpreted using an ICR technique and the interpreted text may then be inserted at the appropriate location in the stored document. If the editing symbol of step 513 is found, the text in the stored document that is located at the same position as the editing symbol may be removed from the stored document. If the editing symbol of step 515 is found, a corresponding editing symbol and any handwritten text close to that editing symbol may be searched for in the margin area of the printed document. Such text may be interpreted using an ICR technique and the interpreted text may then be inserted at the appropriate location in the stored document, replacing the text at the position of the editing symbol in the stored text. If the editing symbol of step 517 is found, one or more letters within the left part, i.e. within the left "loop", of the editing symbol may be identified. Then, one or more letters within the right part of the editing symbol may be identified. The identified text from the left part may be moved to the right part of the editing symbol, and vice versa.

From the above it is understood that each editing symbol may result in an editing command being generated, either in the pen itself or in a computer unit that communicates with the pen and may comprise software for identifying editing symbols.

As discussed above, it may be in many cases convenient to print the document information onto a pre-printed sheet on which a position-coding pattern already has been provided. However, it may be desirable to have an extra degree of freedom in that the document information is printed together with the position-coding pattern. Such an aspect of the present invention may be useful in situations where a user has the capability to calculate a position-coding pattern and apply it to the sheet to be printed. Moreover, as discussed briefly above, the present invention allows for a plurality of editors to edit the same document. By associating editing commands with timestamps and users, e.g. by way of unique identity codes associated with the digital pens, a sequence of editing commands can be interpreted by the computer which holds the electronic version of the document.

It is to be understood that the editing symbols and markings shown in FIGS. 5a, 5b and 5c only should be seen as examples of how editing information can be configured. The editing symbols may include conventional proof reader's marks and can be a subset of a larger set of symbols comprising more or less complicated indications of how the subsequent interpretation should be carried out and how the real changes of the stored document are to appear. The corresponding set of editing commands can be determined in advance or be generated by, for example, a user through a suitable learning process according to a prior art technique.

Figure 6:
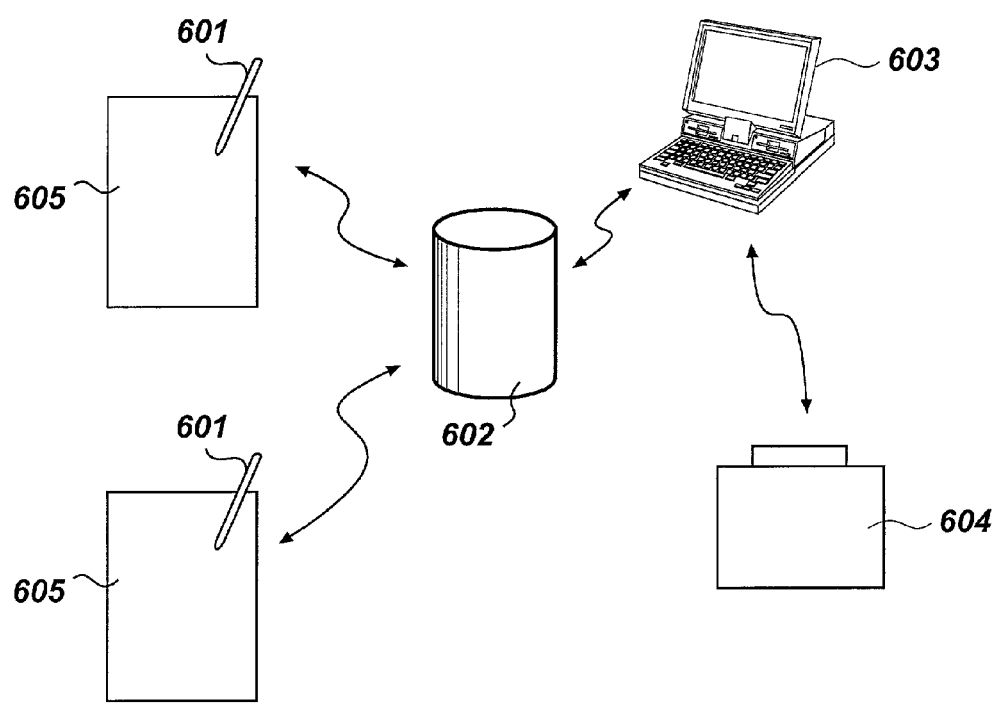
FIG. 6 schematically shows an embodiment of a system for editing document information consistent with the present invention.

FIG. 6 shows a system that may be used in carrying out the method described above. The system may include a plurality of pen-shaped reading devices 601, a central unit 602, a local processing unit 603, and a printer unit 604. The reading devices 601 may correspond to the digital pen shown in FIG. 4 and may be arranged for wireless communication with the central unit 602, for example directly via a telecommunications network, or indirectly via short-range communication to a modem unit (not shown), such as a mobile phone, a personal computer, a Bluetooth® node etc., which in turn connects to the central unit 602 via a suitable network, for example the Internet, a telecommunications network, a LAN etc. Likewise, the central unit 602 may be arranged for communication with the local processing unit 603, typically a computer device such as a personal computer, in which the electronic document to be annotated may be created. As will be further described below, the central unit 602 may act, inter alia, as a pattern administration unit. The communication between the local processing unit 603 and the central unit 602 can be handled by a messaging service, such as email, if direct communication is unavailable. Further, the local processing unit 603 may be arranged to communicate with a printer unit 604.

After having created a document in or transferred a document to the local processing unit 603, the author may register the document with the central unit 602. In this process, the central unit 602 may receive from the local processing unit 603 a file identifier and data on the number of standard pages of the document to be registered. Alternatively, the central unit 602 may receive an electronic copy of the document. In the central unit 602, the pages of the electronic document may be assigned a corresponding number of pattern pages, i.e. mutually unique subsets of the above-described position-coding pattern. After registration, the original document, or a copy thereof, may be "locked" to prevent further manipulation and may be stored on the local processing unit 603 or the central unit 602.

Then, the author may distribute the locked document to different reviewers. The author may send the electronic document from the local processing unit 603 to the printer unit 604 and then physically distribute the printouts, or distribute the document electronically so that the reviewers can print the document on any nearby printer units (not shown). Alternatively, the different reviewers might themselves download the document from the central unit 602 to a respective computer, from which the document can be sent to a suitable printer unit.

Thereafter, each reviewer may use his reading device 601 to write on his printout 605, wherein the reading device 601 electronically registers the positions where it is applied to the printout, thereby producing a digital copy of editing information written on the pages of the printout. When a reviewer is finished with his review, he synchronizes his reading device 601 with the central unit 602. In this process, the digital editing information, i.e. position data read by the reading device 601, may be sent to the central unit 602 together with a reading device identifier and optionally timestamps, indicating when the annotations were made. The synchronization can be effected, for example, by the reviewer checking a send icon (not shown) on the printout 605, the send icon being provided with a specific part of the position-coding pattern. When the processor unit of the reading device 601 registers one or more positions coded by this specific part of the pattern, it initiates the synchronization. Alternatively, the reviewer can operate a button on the reading device 601 to initiate the synchronization. As a further alternative, the digital editing information can be sent to the central unit 602 in real time, i.e. while the reviewer is actually writing the editing information on the printout 605.

Upon completed synchronization with one or more reading devices 601, the central unit 602 may issue a message to the local processing device 603, whereupon the author can connect to the central unit 602 to download the feedback from the reviewers, one or more at a time. The central unit 602 may also translate the editing information to local positions on each page of the electronic document, so that the local processing unit 603 can incorporate the editing information into the electronic document to be displayed to the author. If a copy of the electronic document has been sent to the central unit 602, the incorporation can be effected by the central unit 602, which then may transmit an electronic file back to the local processing unit 603 for display to the author.

In an alternative embodiment (not shown), the pattern administration functionality of the central unit 602 may be incorporated into the local processing unit 603, so that one or more reading devices communicate with the local processing unit, typically a personal computer, a PDA or the like.

In another alternative embodiment (not shown), the central unit 602 may only serve the function of assigning pattern pages to the electronic document, i.e. the local processing unit 603 receives a file with the pattern pages, or parameters for calculating the same, from the central unit 602. The local processing unit 603 then communicates with the reading devices 601 and produces an updated document based on the received editing information.

In a further embodiment, the reading device 601 may be capable of interpreting the editing symbols, so that the reading device 601 can transmit an editing command to the local processing unit 603. Optionally, the reading device 601 is also capable of effecting an ICR analysis, for example, of relevant parts of the editing information written on the printout.

Although the author and the reviewers have been described as separate individuals, it should be evident that in the method and system described above the author may act as a reviewer as well. It is also to be understood that the central unit 602 can communicate with a plurality of local processing units, to thereby act as a hub in an infrastructure for handling information.

It should also be noted that the incorporation of the editing information might or might not include interpreting the markings made by the reviewers on the sheet 605 containing the printed text. In some reviewing work, it may be desirable to enable for one or more reviewers to simply annotate the text, in the margins for example, and to associate those annotations with specific positions within the text and to enable an owner of the document to view the text together with the annotations. Thereby, instead of being forced to edit part of the text or graphics on the printout, the reviewer may be allowed to write brief comments or draw sketches in the margins of the document to aid the author in his further drafting of the document. In this case, after review, the document information of the updated electronic document includes the original text and the handwritten annotations made by the reviewers. It is to be appreciated that the reviewer can be allowed to use both annotations and editing symbols/markings in one and the same document. This can be achieved, for example, by using a specific set of annotation symbols that identifies a piece of editing information as an annotation.

The local processing unit 603 may suitably include presentation software, which can be arranged to present the annotations in the form of, for example, pop-up windows, or the like overlaid on the original document. By associating different users, via the device identifier, with the different annotations it is possible to include functions in the presentation software that, for example, presents the comments of the annotators one at a time. It should also be noted that the presentation software could be set to prompt the author for approval before inserting any interpreted text associated with an editing symbol into the electronic document.

In the context of the invention, especially when allowing for annotations, it might be of importance to anchor the editing information to specific positions within the document, more specifically to specific portions of the text, such as chapters, paragraphs, lines or single words. When the author starts editing the original document based on the editing information, the overlaid handwritten comments must be maintained in synch with their original position. This is achieved by anchoring the annotations to the text, for example via an agreed set of annotation symbols which associates a comment written in the margin of the document with a portion of the text in the document. Such a symbol may be of any kind, for example as discussed in connection with FIGS. 5a-5c above.

The different steps described above may be suitably performed by software running on the units 602, 603 and devices 601 of the system. This software could be contained in the system or distributed to the system on one or more computer readable media, for example a volatile memory or a nonvolatile memory such as a floppy diskette or CD-ROM. The software could also be distributed on computer readable media in the form of propagated signals, such as the stream of bits that represent Internet transmissions of packets or the carrier waves that are transmitted to satellites.

Concurrently filed with the application for this patent are applications entitled Systems and Methods for Information Storage based on Swedish Application No. 0000947-2, filed Mar. 21, 2000, and U.S. Provisional Application No. 60/207, 839, filed May 30, 2000; Secured Access Using a Coordinate System based on Swedish Application No. 0000942-3, filed Mar. 21, 2000, and U.S. Provisional Application No. 60/207, 850 filed on May 30, 2000; System and Method for Printing by Using a Position Coding Pattern based on Swedish Application No. 0001245-0, filed on Apr. 5, 2000, and U.S. Provisional Application No. 60/210,651, filed on Jun. 9, 2000; Apparatus and Methods Relating to Image Coding based on Swedish Application No. 0000950-6, filed on Mar. 21, 2000, and U.S. Provisional Application No. 60/207,838, filed on May 30, 2000; Apparatus and Methods for Determining Spatial Orientation based on Swedish Application No. 0000951-4, filed on Mar. 21, 2000, and U.S. Provisional Application No. 60/207,844, filed on May 30, 2000; System and Method for Determining Positional Information based on Swedish Application No. 0000949-8, filed Mar. 21, 2000, and U.S. Provisional Application No. 60/207,885, filed on May 30, 2000; Method and System for Transferring and Displaying Graphical Objects based on Swedish Application No. 0000941-5, filed Mar. 21, 2000, and U.S. Provisional Application No. 60/208,165, filed May 31, 2000; Online Graphical Message Service based on Swedish Application No. 0000944-9, filed Mar. 21, 2000, and U.S. Provisional Application No. 60/207,881, filed May 30, 2000; Method and System for Digitizing Freehand Graphics With User-Selected Properties based on Swedish Application No. 0000945-6, filed Mar. 21, 2000, U.S. Provisional Application No. 60/207,882, filed May 30, 2000; Data Form Having a Position-Coding Pattern Detectable by an Optical Sensor based on Swedish Application No. 0001236-9, filed Apr. 5, 2000, and U.S. Provisional Application No. 60/208,167, filed May 31, 2000; Method and Apparatus for Managing Valuable Documents based on Swedish Application No. 0001252-6, filed Apr. 5, 2000, and U.S. Provisional Application No. 60/210,653 filed Jun. 9, 2000; Method and Apparatus for Information Management based on Swedish Application No. 0001253-4 filed Apr. 5, 2000, and U.S. Provisional Application No. 60/210, 652, filed Jun. 9, 2000; Device and Method for Communication based on Swedish Application No. 0000940-7, filed Mar. 21, 2000, and U.S. Provisional Application No. 60/208,166, filed May 31, 2000; Information-Related Devices and Methods based on Swedish Application No. 0001235-1, filed Apr. 5, 2000, and U.S. Provisional Application No. 60/210,647, filed Jun. 9, 2000; Processing of Documents based on Swedish Application No. 0000954-8, filed Mar. 21, 2000, and U.S. Provisional Application No. 60/207,849, filed May 30, 2000; Secure Signature Checking System based on Swedish Application No. 0000943-1, filed Mar. 21, 2000, and U.S. Provisional Application No. 60/207,880, filed May 30, 2000; Identification of Virtual Raster Pattern, based on Swedish Application No. 0001235-1, filed Apr. 5, 2000, and U.S. Provisional Application No. 60/210,647, filed Jun. 9, 2000, and Swedish Application No. 0004132-7, filed Nov. 10, 2000, and U.S. Provisional Application No. 60/261,123, filed Jan. 12, 2001; and U.S. Provisional Application No. 60/227,285 filed on Mar. 21, 2001.

The technical disclosures of each of the above-listed U.S. applications, U.S. provisional applications, and Swedish applications are hereby incorporated herein by reference. As used herein, the incorporation of a "technical disclosure" excludes incorporation of information characterizing the related art, or characterizing advantages or objects of this invention over the related art.

In the foregoing Description of Preferred Embodiments, various features of the invention are grouped together in a single embodiment for purposes of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Description of the Preferred Embodiments, with each claim standing on its own as a separate preferred embodiment of the invention.

What is claimed is:

1. A method of editing a document, the method comprising:
    transferring document information to a printing device adapted to print the document information on a surface having a position-coding pattern, the position-coding pattern comprising symbols associated with grid points of a grid and coding a plurality of positions on the surface, each position being coded by a plurality of the symbols, wherein each symbol contributes to the coding of more than one of the plurality of positions;
    receiving editing information from a reading device adapted to read position information from the position-coded surface;
    interpreting the editing information; and
    changing the document information depending on an interpretation of the editing information, thereby resulting in an updated document.

2. A method for editing a document, the method comprising:
    initially registering said document in a pattern administration unit;
    the pattern administration unit assigning a unique subset of position-coding pattern to each page of said registered document;
    transferring information indicative of the unique subset of the position-coding pattern, assigned by the pattern administration unit, to a printing device adapted to print the position-coding pattern on a surface;
    transferring document information to the printing device adapted to print the document information on the surface;
    receiving editing information from a reading device adapted to read position information from the position-coded surface;
    interpreting the editing information; and
    changing the document information based on an interpretation of the editing information, thereby resulting in an updated document.

3. A method according to claim 1 or 2, further comprising receiving device identity information from the reading device, the identity information associating the editing information with a user of the reading device.

4. A method according to claim 1 or 2, wherein the editing information is associated with a plurality of users, and wherein each user generates at least one editing command with a reading device.

5. A method according to claim 4, wherein the editing commands generated by the plurality of users are in an ordered sequence identified by at least a timestamp associated with each editing command.

6. A method according to claim 1 or 2, wherein the editing information includes position information related to a position of the reading device on the surface, and wherein the interpretation of the editing information includes interpretation of the position information.

7. A method according to claim 6, wherein the position information is in the form of sequences of coordinates forming manually generated curves corresponding in form to drawn curves on the printed document.

8. A method according to claim 1 or 2, further comprising displaying the document information of the updated document to a user.

9. A method according to claim 1 or 2, wherein the step of changing the document information includes adding editing information in the form of handwritten annotations to the document.

10. A method according to claim 9, further comprising associating, based on position information included in the editing information, each of the handwritten annotations with a respective portion of the document information.

11. A method according to claim 1 or 2, wherein changing the document information includes reformatting one or more parts of the document information.

12. A method according to claim 11, wherein said reformatting is chosen from the group of:
adding text or graphics to said document information; removing text or graphics from said document information; or repositioning text or graphics included in said document information.

13. A method according to claim 12, wherein adding text includes converting part of the editing information to machine-readable text.

14. A computer program tangibly embodied on a computer readable-medium which can be read by a computer and which comprises instructions for causing a computer to execute the method according to claim 1 or 2.

15. The method of claim 2, wherein the position-coding pattern comprises symbols associated with grid points of a grid and codes a plurality of positions on the surface, each position being coded by a plurality of the symbols, wherein each symbol contributes to the coding of more than one of the plurality of positions.

16. The method of claim 2, wherein the pattern administration unit, in the registering, receives document data indicative of the document and of a number of document pages.

17. The method of claim 16, wherein the document data includes the document.

18. The method of claim 1, wherein each symbol codes a value which is determined by a displacement of a marking in relation to a grid point.

19. The method of claim 2, wherein the position-coding pattern comprises a grid and a plurality of symbols, the value of each symbol being determined by a displacement of a marking in relation to the grid.

20. The method of claim 2, wherein the document is a word-processing document.

21. A system for document editing, the system comprising:
storage means for storing a document;
means for transferring information from the document to a printing device capable of printing the information on a surface provided with a position-coding pattern, the position-coding pattern comprising symbols associated with grid points of a grid and coding a plurality of positions on the surface, each position being coded by a plurality of the symbols, wherein each symbol contributes to the coding of more than one of the plurality of positions;
means for receiving editing information from a reading device adapted to read position information from a position-coded surface;
means for interpreting the editing information; and
means for changing the document information based on an interpretation of the editing information, thereby resulting in an updated document.

22. A system for document editing, the system comprising:
storage means for storing a document;
registration means which is arranged to initially register the document in a pattern administration unit comprising a database of a position-coding pattern, the pattern administration unit being arranged to assign a unique subset of the position-coding pattern to each page of the registered document;
means for transferring information indicative of the unique subset of the position-coding pattern, assigned by the pattern administration unit, to a printing device capable of printing the position-coding pattern on a surface;
means for transferring information contained in the document to the printing device, the printing device being adapted to print the information on the surface;
means for receiving editing information from a reading device adapted to read position information from a position-coded surface;
means for interpreting the editing information; and
means for changing the document information based on an interpretation of the editing information, thereby resulting in an updated document.

23. A system according to claim 21 or 22, further comprising means for receiving device identity information from the reading device, so as to associate the editing information with a user of the reading device.

24. A system according to claim 22, wherein said storage means and said registration means are included in a computer device.

25. A system according to claim 24, wherein said means for receiving editing information is included in said pattern administration unit.

26. A system according to claim 24, wherein said means for receiving editing information is included in a local processing unit.

27. The system of claim 22, wherein the registration means is arranged to transfer document data indicative of the document and of a number of document pages to the pattern administration unit.

28. The system of claim 27, wherein the document data includes the document.

29. The system of claim 21, wherein each symbol codes a value which is determined by a displacement of a marking in relation to a grid point.

30. The system of claim 22, wherein the position-coding pattern comprises a grid and a plurality of symbols, the value of each symbol being determined by a displacement of a marking in relation to the grid.

31. A method of editing a document containing information, the method comprising:
storing the document information in memory;
printing the document information on a surface, wherein the surface contains a readable code contained thereon in addition to the printed document information, wherein the readable code comprises a grid and a plurality of symbols, the value of each symbol being determined by a displacement of a marking in relation to the grid;
enabling an electronic pen to physically mark edit instructions on the surface and to electronically capture the edit instructions by reading the readable code proximate the marked edit instructions;
receiving through a processor associated with the memory the edit instructions captured by the electronic pen; and
altering the document information in memory to conform to the edit instructions.

32. The method of claim 31, wherein the readable code is a position coding pattern.

33. The method of claim 31, wherein the readable code comprises symbols associated with grid points of a grid and codes a plurality of positions on the surface, wherein each position is coded by a plurality of the symbols, and wherein each symbol contributes to the coding of more than one of the plurality of positions.

* * * * *